United States Patent
Hui et al.

(10) Patent No.: US 9,867,205 B2
(45) Date of Patent: Jan. 9, 2018

(54) STAGE-BY-STAGE SUCCESSIVE MIMO DECODING FOR MULTIHOP COMMUNICATIONS

(71) Applicant: Telefonaktiebolaget LM Ericsson (publ), Stockholm (SE)

(72) Inventors: Dennis Hui, Sunnyvale, CA (US); Songnam Hong, Yongin-Si (KR); Ivana Maric, Sunnyvale, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/099,255

(22) Filed: Apr. 14, 2016

(65) Prior Publication Data

US 2016/0309484 A1    Oct. 20, 2016

Related U.S. Application Data

(60) Provisional application No. 62/147,871, filed on Apr. 15, 2015.

(51) Int. Cl.
*H04W 72/08* (2009.01)
*H04B 7/0413* (2017.01)
(Continued)

(52) U.S. Cl.
CPC ........ *H04W 72/085* (2013.01); *H04B 7/0413* (2013.01); *H04B 7/15507* (2013.01); *H04L 45/16* (2013.01)

(58) Field of Classification Search
CPC .................. H04W 52/46; H04W 88/04; H04L 2001/0097; H04L 1/0054; H04L 1/005;
(Continued)

(56) References Cited

U.S. PATENT DOCUMENTS

2013/0215905 A1* 8/2013 Driscoll ............ H04L 12/40136
370/445
2015/0103691 A1* 4/2015 Bhattacharya .......... H04L 45/50
370/254

OTHER PUBLICATIONS

Wagner et al. "on capacity scaling of multi-antenna multi-hop networks: the significance of the relaying strategy in the"long network limit; IEEE transactions on information theory, vol. 58, No. 4; Apr. 2012; pp. 2107-2133.*
(Continued)

*Primary Examiner* — Rahel Guarino
(74) *Attorney, Agent, or Firm* — Baker Botts, LLP

(57) ABSTRACT

According to some embodiments, a method of estimating a relayed wireless signal in a multihop network comprises receiving, at a destination network node, a wireless signal relayed from a plurality of network nodes. The received wireless signal comprises successive quantizations of a source wireless signal performed at each relay stage. The destination network node also receives a plurality of messages, each including quantization information associated with the quantization performed at a corresponding relay stage. The destination network node estimates a wireless signal received at a previous relay stage using a quantized multiple-input multiple-output (MIMO) channel model with the received wireless signal and a message corresponding to the quantization performed at the previous relay stage. The destination network node estimates the source wireless signal using the estimated wireless signal received at the previous stage and the remaining messages to estimate a wireless signal received at each of the previous relay stages.

20 Claims, 7 Drawing Sheets

400

(51) Int. Cl.
*H04L 12/761* (2013.01)
*H04B 7/155* (2006.01)

(58) Field of Classification Search
CPC ............... H04L 47/14; H04L 25/03235; H04L 25/0256; H04L 25/0258; H04L 25/03242; H04L 25/0242; H04L 25/03898; H04L 25/4927; H04B 7/0413; H04B 7/15; H04B 7/15507
USPC ........... 375/267, 260, E1.024, 341; 370/312, 370/349; 455/445
See application file for complete search history.

(56) References Cited

OTHER PUBLICATIONS

PCT Notification of Transmittal of the International Search Report and the Written Opinion of the International Searching Authority, or the Declaration for International application No. PCT/IB2016/052171—Jul. 29, 2016.
On Capacity Scaling of Multi-Antenna Multi-Hop Networks: The Significance of the Relaying Strategy in the "Long Network Limit" by Jörg Wagner and Armin Wittneben; IEEE Transactions on Information Theory. vol. 58, No. 4—Apr. 2012.
Richard Draves et al., "Routing in Multi-Radio, Multi-Hop Wireless Mesh Networks," MobiCom '04, Sep. 26-Oct. 1, 2004, Philadelphia, PA, ACM 1-581130868-7.04.0009, Copyright 2004.
Yaling Yang et al., "Designing Routing Metrics for Mesh Networks," Proceedings of the 1st IEEE workshop on Wireless Mesh Netwoks (WiMesh'05), Santa Clara, CA, Sep. 26, 2005.
Georgios Parissidis et al., "Interference-Aware Routing in Wireless Multihop Networks," Diss. Eth No. 17737, M.Eng. TUC Greece, DEA Universite Paris VI, 2008.
Douglas S.J. De Couto et al., "A High-Throughput Path Metric for Multi-Hop Wireless Routing," Wireless Networks 11, Copyright 2005 Springer Science + Business Media, Inc. Manufactured in the Netherlands, 2005.
A. Salman Avestimehr et al, "Wireless Network Information Flow: A Deterministic Approach," arXiv:0906.5394v7 [cs.IT], Feb. 25, 2011.
Song-Nam Hong et al., "A Novel Cooperative Strategy for Wireless Multihop Backhaul Networks," arXiv:1508.00077 [cs.IT], Submitted on Aug. 1, 2015.
Dennis Hui et al., "Joint Routing and Resource Allocation for Wireless Self-Backhaul in an Indoor Ultra-Dense Network," in Proc. IEEE Int. Symp. Personal, Indoor and Mobile Radio Comm., London, UK, 2013.
K. Jain et al., "Impact of Interference on Multi-Hop Wireless Network Performance," in Proc. the Annual International Conference on Mobile Computing and Networking (MobiCom), San Diego, CA, Copyright 2003, ACM 1-58113-753-2-03-0009, dated Sep. 14-19, 2003.
Hui et al., U.S. Appl. No. 62/147,871, entitled "Stage-by-Stage Subbessive MIMO Decoding for Multihop Communication Schemes," filed Apr. 15, 2015.
Sung Hoon Lim et al., "Noisy Network Coding," IEEE Transactions on Information Theory, No. 0018-9448, vol. 57, No. 5, dated May 2011.

\* cited by examiner

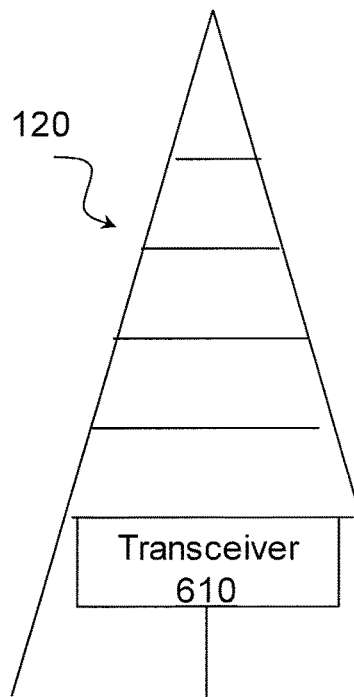
*FIG. 6A*
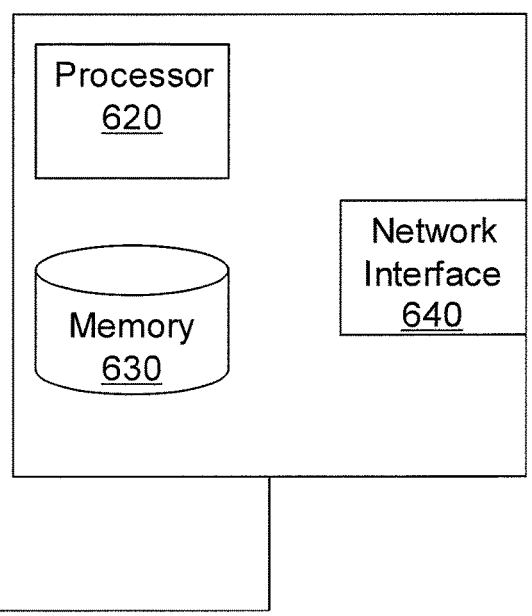
*FIG. 6B*
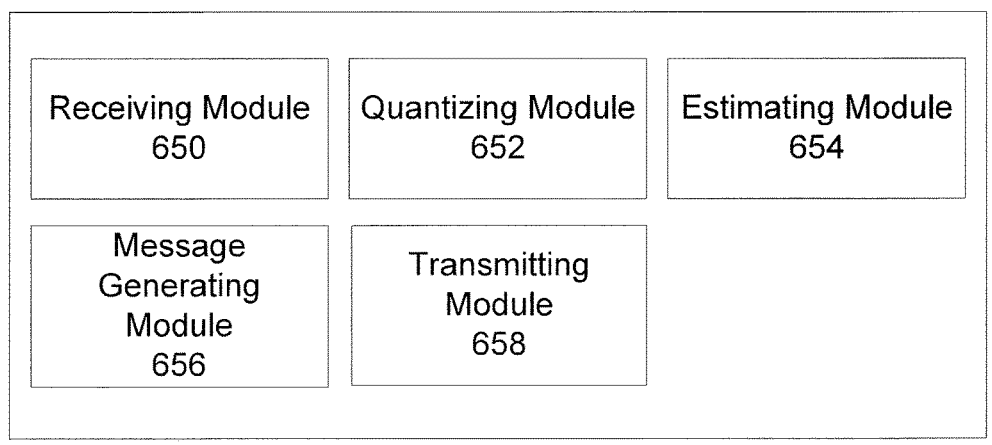

STAGE-BY-STAGE SUCCESSIVE MIMO DECODING FOR MULTIHOP COMMUNICATIONS

TECHNICAL FIELD

Particular embodiments relate generally to wireless communications networks, and more particularly to stage-by-stage successive multi-input multi-output (MIMO) decoding for multihop communications.

RELATED APPLICATION

This application claims benefit under 35 U.S.C. §119(e) to U.S. Provisional Application Ser. No. 62/147,871, entitled "STAGE-BY-STAGE SUCCESSIVE MIMO DECODING FOR MULTIHOP COMMUNICATION SCHEMES," filed Apr. 15, 2015, the entire content of which is incorporated herein by reference.

BACKGROUND

Providing wireless communication services with the exponential growth in wireless data traffic may require substantially denser deployment of base stations or wireless access nodes. The feasibility of a dense deployment of wireless access nodes is predicated on the existence of a backhaul network that can provide high-data-rate transport for each individual access node in the network. Optical-fiber-based backhaul solutions are desirable for maximizing capacity and are well-suited for new construction. For existing buildings and infrastructure, however, installing new optical fiber to every access node in such a dense network can be cost prohibitive.

An alternative is a wireless self-backhaul solution, where the same access spectrum is used to also provide backhaul transport. Using self-backhauling, an access node serves its own assigned user equipments (UEs) in its vicinity and serves its neighboring access nodes as a relaying node to transfer data to or from an information aggregation node in the network. A group of self-backhauling access nodes can form a multi-hop mesh network. Access nodes cooperatively transfer each other's traffic to and from the aggregation node.

Because of the broadcast nature of wireless medium, interference can limit the network throughput for a wireless multihop backhaul network. Interference-aware routing is one solution that offers a significant throughput gain over shortest-path routing. Some interference-aware solutions may include joint routing and resource allocation for wireless self-backhaul networks.

These interference-aware routing algorithms attempt to avoid inter-path interference by assuming that each relay decodes its desired message by treating other signals as noise. This approach, however, incurs significant limitation on network throughput at high load (i.e., the number of sources is large). This result is expected because avoiding all inter-path interference at a high load is nearly impossible. Furthermore, because the transmission rate on every route is determined by the minimum of all link-capacities on the route, one strong interference on a path can drastically degrade the end-to-end performance.

The process in interference-aware routing by which each relay on a route decodes its desired message (by treating other signals as noise), re-encodes it, and then forwards it, may be referred to as decode-and-forward (DF). Other alternatives may use a transmission scheme in which operation at a relay is referred to a quantize-map-forward (QMF) (also referred to as noisy network coding). Using QMF, each relay quantizes its observed signal, re-encodes (or randomly bins) it, and forwards it. Because the relay does not decode the message, the relay is not constrained by decoding (unlike DF). In fact, any interfering signal that the relay receives will be forwarded through QMF and treated as a useful signal at the destination node. For this reason, QMF may perform better than a DF scheme. QMF, however, typically requires high complexity joint decoding, which is hard to implement in practical systems.

SUMMARY

The embodiments described herein include advanced coding schemes to efficiently manage strong interference in a multihop network, instead of treating it as noise. Particular embodiments include a stage-by-stage successive multi-input multi-output (MIMO) decoding at a destination node that approaches the performance of the optimal joint decoding but with significantly lower complexity. In particular embodiments, the destination node is the node that decodes the messages from all the relays. The destination node decodes the relayed messages in a sequential method. For example, the destination node decodes the messages of relays in the stage K, then the messages of relays in the stage K−1, and so on. To decode the relayed messages in each stage, the destination node may use a conventional MIMO receiver as a sphere decoder, a zero-forcing receiver, a MMSE receiver, and an integer-forcing receiver.

According to some embodiments, a method of relaying wireless signals from a first network node to a second network node in a multihop wireless communications network comprises receiving, at a first network node, a wireless signal. The first network node quantizes the wireless signal and associates quantization information with the quantized wireless signal in a message. The first network node transmits the quantized wireless signal and the message to a second network node.

In particular embodiments, the quantization information may include at least one of a quantization index, a quantization level, a quantization rate, and a quantization codebook. The message may further include a channel matrix associated with the received wireless signal. Transmitting the message to the second network node may comprise encoding the message inband or may comprise out-of-band signaling.

According to some embodiments, a method of estimating a relayed wireless signal at a destination network node in a multihop wireless communications network comprises receiving, at a destination network node, a wireless signal relayed from a plurality of network nodes. Each of the network nodes corresponds to a relay stage. The received wireless signal comprises successive quantizations of a source wireless signal performed at each relay stage by one of the plurality of network nodes. The destination node receives a plurality of messages. Each message of the plurality of messages includes quantization information associated with the quantization performed at a corresponding relay stage. The method further comprises estimating a wireless signal received at a previous relay stage using a quantized MIMO channel model with the received wireless signal and a message of the plurality of messages corresponding to the quantization performed at the previous relay stage. The method continues to estimate the source wireless signal using the estimated wireless signal received at the previous relay stage and the plurality of messages to estimate a wireless signal received at each of the previous relay stages.

In particular embodiments, the quantization information may include at least one of a quantization index, a quantization level, a quantization rate, and a quantization codebook. Each message of the plurality of messages may include a channel matrix associated with the received wireless signal and estimating the wireless signal received at a previous relay stage may comprise using the channel matrix associated with the received wireless signal.

In particular embodiments, receiving the plurality of messages may comprise receiving messages encoded inband or may comprise receiving out-of-band signaling. Estimating the wireless signal using a quantized MIMO channel model may comprise using at least one of a sphere decoder, a zero-forcing receiver, a minimum-mean square error (MMSE) receiver, and an integer-forcing receiver.

According to some embodiments, a network node operable to relay wireless signals to a second network node in a multihop wireless communications network comprises a processor operable to: receive a wireless signal; quantize the wireless signal; associate quantization information with the quantized wireless signal in a message; and transmit the quantized wireless signal and the message to a second network node.

According to some embodiments, a network node operable to estimate a relayed wireless signal in a multihop wireless communications network comprises a processor operable to receive a wireless signal relayed from a plurality of relay network nodes. Each of the relay network nodes corresponds to a relay stage. The received wireless signal comprises successive quantizations of a source wireless signal performed at each relay stage by one of the plurality of relay network nodes. The processor is further operable to receive a plurality of messages. Each message of the plurality of messages includes quantization information associated with the quantization performed at a corresponding relay stage. The processor also estimates a wireless signal received at a previous relay stage using a quantized MIMO channel model with the received wireless signal and a message of the plurality of messages corresponding to the quantization performed at the previous relay stage. The processor is further operable to estimate the source wireless signal using the estimated wireless signal received at the previous relay stage and the plurality of messages to estimate a wireless signal received at each of the previous relay stages.

According to some embodiments, a network node operable to relay wireless signals to a second network node in a multihop wireless communications network comprises a receiving module, a quantizing module, a message generating module, and a transmitting module. The receiving module is operable to receive a wireless signal. The quantizing module is operable to quantize the wireless signal. The message generating module is operable to associate quantization information with the quantized wireless signal in a message. The transmitting module is operable to transmit the quantized wireless signal and the message to a second network node.

According to some embodiments, a network node operable to estimate a relayed wireless signal in a multihop wireless communications network comprises a receiving module and an estimating module. The receiving module is operable to receive a wireless signal relayed from a plurality of relay network nodes. Each of the relay network nodes corresponds to a relay stage. The received wireless signal comprises successive quantizations of a source wireless signal performed at each relay stage by one of the plurality of relay network nodes. The receiving module is further operable to receive a plurality of messages. Each message of the plurality of messages includes quantization information associated with the quantization performed at a corresponding relay stage. The estimating module is operable to estimate a wireless signal received at a previous relay stage using a quantized MIMO channel model with the received wireless signal and a message of the plurality of messages corresponding to the quantization performed at the previous relay stage. The estimating module is further operable to estimate the source wireless signal using the estimated wireless signal received at the previous relay stage and the plurality of messages to estimate a wireless signal received at each of the previous relay stages.

Also disclosed is a computer program product. The computer program product comprises instructions stored on non-transient computer-readable media which, when executed by a processor, perform the acts of receiving a wireless signal; quantizing the wireless signal; associating quantization information with the quantized wireless signal in a message; and transmitting the quantized wireless signal and the message to a second network node.

Another computer program product comprises instructions stored on non-transient computer-readable media which, when executed by a processor, perform the acts of receiving, at a destination network node, a wireless signal relayed from a plurality of network nodes. Each of the network nodes corresponds to a relay stage. The received wireless signal comprises successive quantizations of a source wireless signal performed at each relay stage by one of the plurality of network nodes. The instructions, when executed by a processor, further perform the act of receiving a plurality of messages. Each message of the plurality of messages includes quantization information associated with the quantization performed at a corresponding relay stage. The instructions, when executed by a processor, further perform the acts of estimating a wireless signal received at a previous relay stage using a quantized MIMO channel model with the received wireless signal and a message of the plurality of messages corresponding to the quantization performed at the previous relay stage; and estimating the source wireless signal using the estimated wireless signal received at the previous relay stage and the plurality of messages to estimate a wireless signal received at each of the previous relay stages.

Particular embodiments may exhibit some of the following technical advantages. Particular embodiments substantially improve the data throughput of a multihop network over the conventional (single-route) routing solutions, while also maintaining relatively low decoding complexity. Particular embodiments may realize improvements over joint decoding and maintain low decoding complexity by decoding the relayed signals as MIMO channels. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 6A is a block diagram illustrating an example embodiment of a network node;

FIG. 6B is a block diagram illustrating example components of a network node.

DETAILED DESCRIPTION

Figure 1:
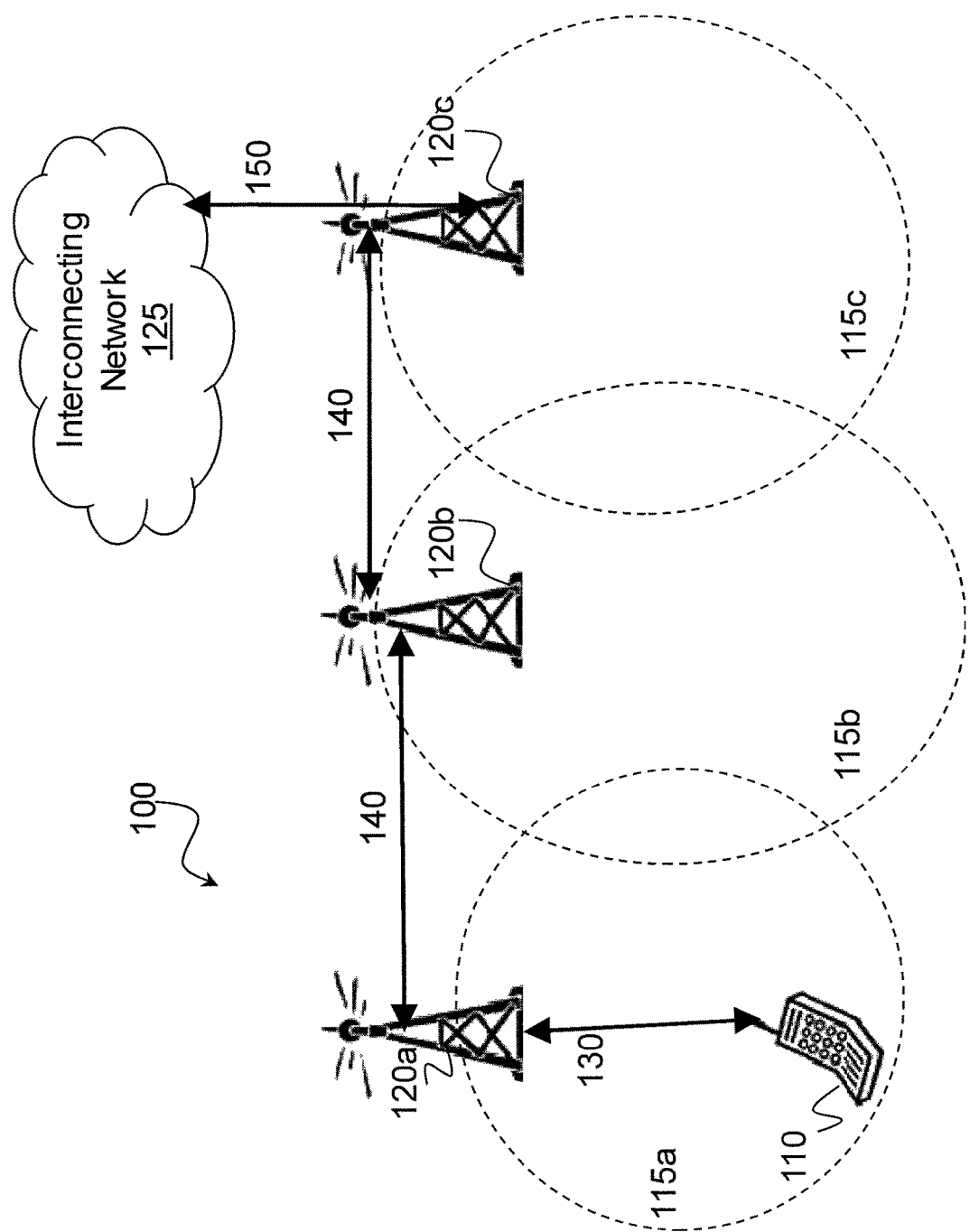
FIG. 1 is a block diagram illustrating an example wireless network, according to a particular embodiment.

Interference-aware routing offers a significant throughput gain over shortest-path routing for a wireless multihop backhaul network. Interference-aware routing may use a QMF transmission scheme in which each relay quantizes its observed signal, re-encodes (or randomly bins) it, and forwards it. Thus, the relay nodes are not constrained by decoding. QMF, however, typically requires high complexity joint decoding, which is hard to implement in practical systems.

Particular embodiments obviate the problems described above and include advanced coding schemes to efficiently manage strong interference in a multihop network. Particular embodiments include a stage-by-stage successive multi-input multi-output (MIMO) decoding at a destination node that approaches the performance of the optimal joint decoding but with significantly lower complexity. In particular embodiments, the destination node is the node that decodes the messages from all the relays. The destination node decodes the relayed messages in a sequential method. For example, the destination node decodes the messages of relays in the stage K, then the messages of relays in the stage K−1, and so on. To decode the relayed messages in each stage, the destination node may use a conventional MIMO receiver as a sphere decoder, a zero-forcing receiver, a MMSE receiver, and an integer-forcing receiver.

The embodiments described herein may apply to any network in which data is sent through relays. For example, the embodiments may apply to wireless networks in general, as well as particular applications such as multihop backhaul, network-assisted D2D communications, cellular networks with relays, etc. Furthermore, one of ordinary skill in the art will realize that various communication nodes (e.g., UE or other station) may perform various processes described herein.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Particular embodiments are described with reference to FIGS. 1-7 of the drawings, like numerals being used for like and corresponding parts of the various drawings. LTE is used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network node 120 may connect to other networks via interconnecting network 125. The connection to interconnecting network 125 may comprise a wired connection, such as optical fiber or copper wire. For example, network node 120c is connected to interconnecting network 125 via wired connection 150. Connection 150 may also be referred to as a backhaul connection.

Other network nodes may not have a wired connection to interconnecting network 125. For example, network nodes 120a and 120b do not have a wired connection to interconnecting network 125. In particular embodiments, network node 120b may access interconnecting network 125 via wireless relay 140 between network node 120b and network node 120c. Similarly, network node 120a may access interconnecting network 125 via wireless relay 140 between network node 120a and network node 120b and wireless relay 140 between network node 120b and network node 120c.

For example, a call from wireless device 110 may include wireless signals 130 to network node 120a which may relay the signals via wireless relay 140 to network node 120b. Network node 120b may relay the signals via wireless relay 140 to network node 120c. Network node 120c may communicate the signals to interconnecting network 125 via wired connection 150. In this example, network node 120a may be referred to as a source node, network node 120b as a relay node, and network node 120c as a destination node. Network 100 may be referred to as a multihop wireless network.

Both source nodes and a relay nodes may use a QMF transmission scheme to relay wireless signals to another relay node or a destination node. For example, network node 120 may receive a wireless signal, quantize the signal to obtain a quantization index (or bin index), encode the quantization index, and send the quantized wireless signal and the encoded quantization index to a relay node in the next stage. Each relay node may repeat the same steps until the quantized wireless signal reaches a destination node.

The destination node may successively decode the received wireless signal to estimate the original signal. For example, network node 120 may decode the quantization index and the received wireless signal using a MIMO channel model to estimate the wireless signal received at the previous relay node. Using the estimated signal, the destination node may repeat the process to estimate the wireless signal at the next previous relay node. The destination node may repeat this process until it has estimated the original wireless signal.

In some embodiments, signals from interconnecting network 125 may be relayed back to wireless device 110 in the other direction. In such an example, network node 120c may be referred to as a source node, network node 120b as a relay node, and network node 120a as a destination node.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7 below. Similarly, a network node may include any suitable combination of hardware and/or software. For example, in particular embodiments, a network node, such as network node 120, may include the components described with respect to FIG. 6A below.

Particular embodiments include a stage-by-stage successive MIMO decoding for multihop wireless networks using a QMF relay transmission scheme. For example, a routing algorithm (e.g., interference-aware routing) may first establish a sequence of relay stages in a network from each source node to a destination node. If the network includes L sources, then L routes are established where each route i comprises $K_i$ relay stages. An example multihop wireless network is illustrated in FIG. 2.

Figure 2:
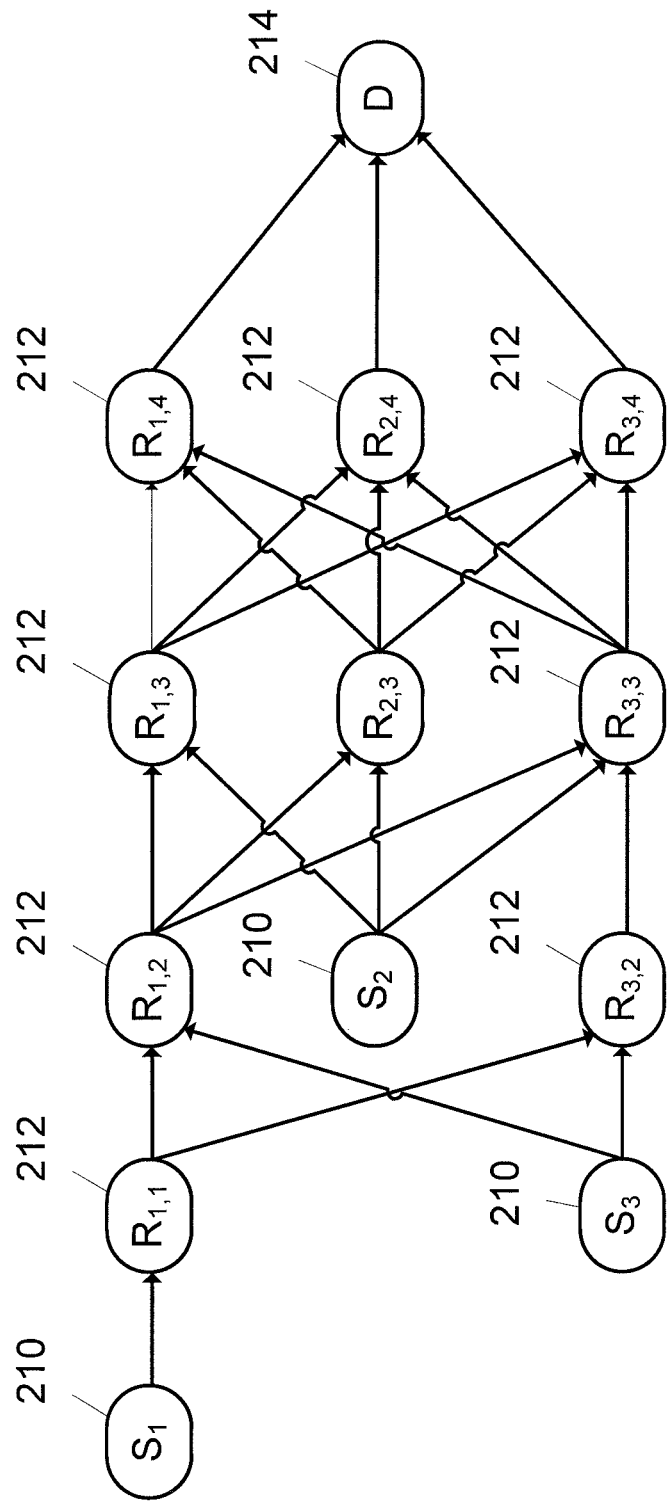
FIG. 2 is a block diagram illustrating an example wireless network with source, relay, and destination nodes, according to a particular embodiment.

FIG. 2 is a block diagram illustrating an example wireless network with source, relay, and destination nodes, according to a particular embodiment. The wireless network may comprise network 100 described with respect to FIG. 1. The wireless network includes source nodes 210, relay nodes 212, and destination node 214. Source node 210, relay nodes 212, and destination node 214 may comprise network nodes 120 described with respect to FIG. 1.

As an example of operation, three source nodes 210 ($S_1$, $S_2$, and $S_3$) may want to communicate with one destination node 214 (D) via multihop transmissions. A first route (from $S_1$ to D) may include 4 relay nodes 212 ($R_{1,1}$, $R_{1,2}$, $R_{1,3}$, and $R_{1,4}$). A second route (from $S_2$ to D) may include 2 relay nodes 212 ($R_{2,3}$ and $R_{2,4}$). A third route (from $S_3$ to D) may include 3 relay nodes 212 ($R_{3,2}$, $R_{3,3}$, and $R_{3,4}$). Each relay $R_{i,k}$ receives signal $y_{i,k}$, quantizes it to $\hat{y}_{i,k}$ to obtain a quantization index (or bin index) denoted by $m_{i,k}$, encodes the quantization index $m_{i,k}$ and sends it to relays in the next stage.

An example of the encoding scheme of particular embodiments may be described with reference to an example network that includes L sources (denoted by $S_i$, i=1, ..., L) and one destination, such as the example network described with respect to FIG. 2. Each route i (from $S_i$ to D) includes $K_i$ relays as ($R_{i,K+1-K_i}$, ..., $R_{i,K}$). Let $w_i$ denote the (source) message of $S_i$ and let $m_{i,k}$ denote the message of relay $R_{i,k}$. A destination node may successively decode the message from each relay to estimate the source message $w_i$.

Figure 3:
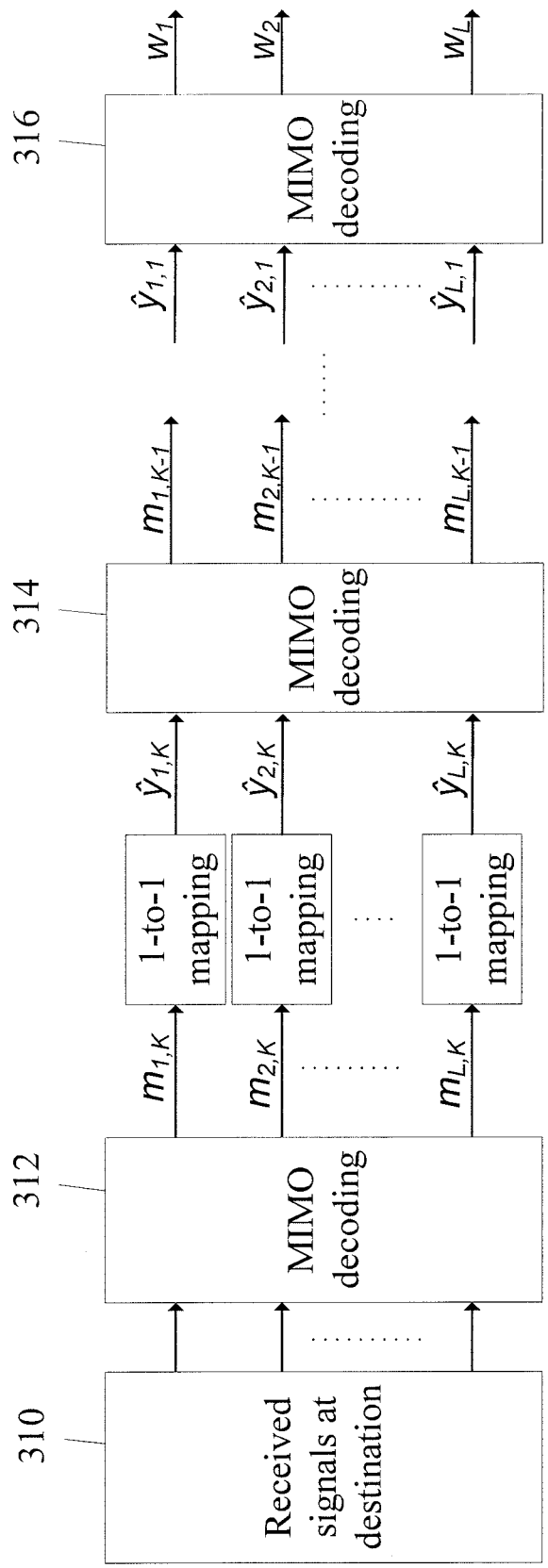
FIG. 3 is a flow diagram illustrating an example method for successively decoding a relayed wireless signal, according to a particular embodiment.

FIG. 3 is a flow diagram illustrating an example method for successively decoding a relayed wireless signal, according to a particular embodiment. In particular embodiments, one or more steps of FIG. 3 may be performed by a network node 120 of wireless network 100 described with respect to FIGS. 1 and 2. FIG. 3 illustrates steps 310, 312, 314, and 316 for stage-by-stage successive MIMO decoding.

At step 310, a destination (such as destination node 214 (D) described with respect to FIG. 2) receives the wireless signals from the last relay node. At step 312, the destination may decode the messages of relays in the last stage K (denoted by ($m_{1,K}$, $m_{2,K}$, ..., $m_{L,K}$)) using the received signals.

Using the decoded messages ($m_{1,K}$, $m_{2,K}$, ..., $m_{L,K}$)), the destination can find quantized received signals at relays at stage K, denoted by ($\hat{y}_{1,K}$, ..., $\hat{y}_{L,K}$). Using the quantized signals, the destination may produce the quantized MIMO channel, given by $$\begin{bmatrix} \hat{y}_{1,K} \\ \vdots \\ \hat{y}_{L,K} \end{bmatrix} = H_K \begin{bmatrix} x_{1,K-1}(m_{1,K-1}) \\ \vdots \\ x_{L,K-1}(m_{L,K-1}) \end{bmatrix} + \begin{bmatrix} z_{1,K} + \hat{z}_{1,K} \\ \vdots \\ z_{L,K} + \hat{z}_{L,K} \end{bmatrix}$$

where $H_K$ denotes the channel matrix between the relays in the stage K and the destination, $x_{i,K}(m_{i,K})$ represents the transmit signal of the relay $R_{i,k}$, $z_{i,K}$ denotes the additive Gaussian noise, and $\hat{z}_{i,k}$ denotes the quantization noise. Using the above channel model, the destination may decode the messages of relays at stage K−1 as $(m_{1,K-1}, m_{2,K-1}, \ldots, m_{L,K-1})$.

At step 314, the destination may use the $(m_{1,K-1}, m_{2,K-1}, \ldots, m_{L,K-1})$ to find quantized received signals at the relays at stage K−1, denoted by $(\hat{y}_{1,K-1}, \ldots, \hat{y}_{L,K-1})$. Using them, it can produce the quantized MIMO channel, given by:

$$\begin{bmatrix} \hat{y}_{1,K-1} \\ \vdots \\ \hat{y}_{L,K-1} \end{bmatrix} = H_{K-1} \begin{bmatrix} x_{1,K-2}(m_{1,K-2}) \\ \vdots \\ x_{L,K-2}(m_{L,K-2}) \end{bmatrix} + \begin{bmatrix} z_{1,K-1} + \hat{z}_{1,K-1} \\ \vdots \\ z_{L,K-1} + \hat{z}_{L,K-1} \end{bmatrix}$$

where $H_{K-1}$ denotes the channel matrix between the relays at stage K−1 and the relays at stage K, $x_{i,K-1}(m_{i,K-1})$ represents the transmit signal of the relay $R_{i,K-1}$, $x_{i,K-1}$ denotes the additive Gaussian noise, and $\hat{z}_{i,K-1}$ denotes the quantization noise. Similarly, using the above quantized MIMO channel, the destination can decode the messages of relays at stage K−2 as $(m_{1,K-1}, m_{2,K-1}, \ldots, m_{L,K-1})$.

By repeatedly applying step 314, the destination may decode the messages of relays at stage K, K−1, . . . , 1, in that order. At step 316, the destination may use the decoded messages of relays at the first stage $(m_{1,1}, m_{2,1}, \ldots, m_{L,1})$ to produce the quantized MIMO channel, given by:

$$\begin{bmatrix} \hat{y}_{1,1} \\ \vdots \\ \hat{y}_{L,1} \end{bmatrix} = H_1 \begin{bmatrix} x_{1,0}(w_1) \\ \vdots \\ x_{L,0}(w_L) \end{bmatrix} + \begin{bmatrix} z_{1,1} + \hat{z}_{1,1} \\ \vdots \\ z_{L,1} + \hat{z}_{L,1} \end{bmatrix}$$

where $H_1$ denotes the channel matrix between the sources and the relays in the first stage, $x_{i,0}(w_i)$ represents the transmit signal of the source i, $z_{i,1}$ denotes the additive Gaussian noise, and $\hat{z}_{i,1}$ denotes the quantization noise. From the above quantized MIMO channel, the destination can decode the source messages $(w_1, w_2, \ldots, w_L)$.

In the example described with respect to FIG. 3, the relay paths from each source to destination included an equal number of relay stages. Particular embodiments may account for an unequal number of relay stages for each path. For example, particular embodiments may perform the procedures described with respect to FIG. 3 by setting the $x_{i,k}=0$ for $i<K-K_i$ and $\hat{y}_{i,k}=0$ for $i<K-K_i+1$, and $m_{K-K_i}=w_i$.

Figure 4:
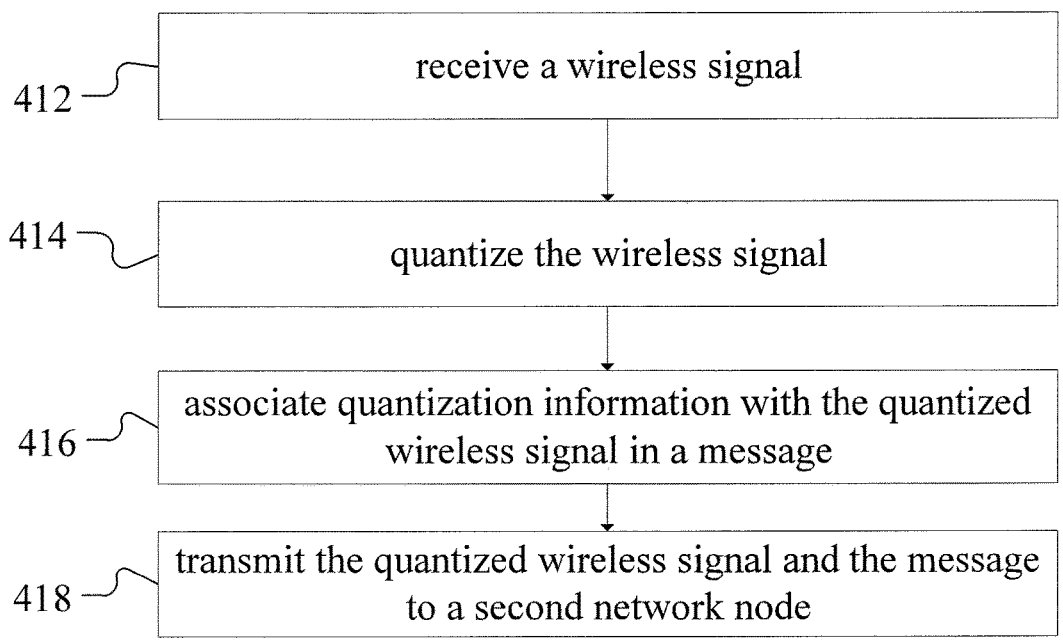
FIG. 4 is a flow diagram of a method of relaying wireless signals from a first network node to a second network node in a multihop wireless communications network, according to particular embodiments.
Figure 5:
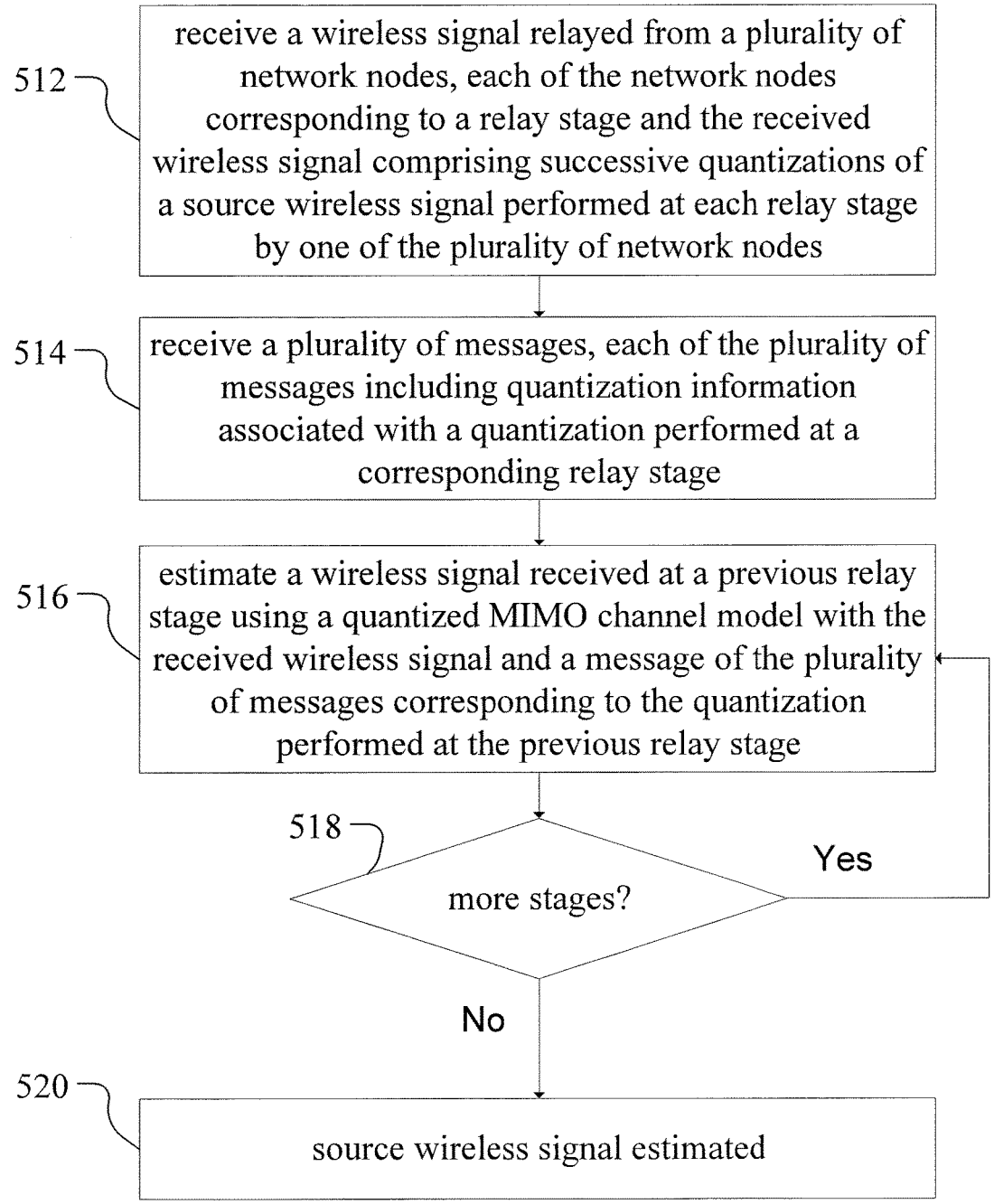
FIG. 5 is a flow diagram of a method of estimating a relayed wireless signal at a destination network node in a multihop wireless communications network, according to particular embodiments.

FIGS. 2 and 3 illustrated example networks with multiples sources L. FIGS. 4 and 5 are example flow diagrams for a single source (i.e., L=1).

FIG. 4 is a flow diagram of a method of relaying wireless signals from a first network node to a second network node in a multihop wireless communications network, according to particular embodiments. In particular embodiments, one or more steps of method 400 may be performed by components of wireless network 100 described with reference to FIGS. 1-7. For example, the first network node may comprise a relay network node 120 such as relay node 212.

The method begins at step 412 where the first network node receives a wireless signal. For example, network node 120b may receive a wireless signal (y) from network node 120a via wireless relay 140.

At step 414, the first network node quantizes the wireless signal. For example, network node 120b may use a QMF transmission scheme (or any other suitable quantization transmission scheme) to quantize the received wireless signal (y). The quantized wireless signal may be referred to as (ŷ). In particular embodiments, the quantization process may use a quantization index (or bin index). The quantization parameter may be referred to as m. In particular embodiments, m may refer to any suitable quantization parameter such as a quantization bit rate, a quantization level, a quantization codebook, etc.

At step 416, the first network node associates quantization information with the quantized wireless signal in a message. In particular embodiments, the destination node may use the associated quantization information from the message to estimate the original signal (y) from the quantized signal (ŷ). For example, in particular embodiments network node 120b may associate the quantization bit rate (or any other suitable quantization parameter) with the quantized signal (ŷ).

Particular embodiments may also include a channel matrix in the message. For example, the channel matrix may describe a pilot or reference signal associated with the original signal (y). The channel matrix $H_k$ described with respect to FIG. 3 is an example of a channel matrix. In some embodiments, the destination node may use the channel matrix and the quantization information to estimate the original signal.

At step 418, the first network node transmits the quantized wireless signal and the message to a second network node. In particular embodiments, the second network node may comprise another relay node or a destination node. For example, network node 120b may transmit quantized wireless signal (ŷ) to network node 120c. Network node 120b may also transmit the message to network node 120c. In particular embodiments, the message may be encoded and transmitted inband with quantized wireless signal (ŷ). Other embodiments may transmit the message using out-of-band signaling.

Modifications, additions, or omissions may be made to method 400. Additionally, one or more steps in method 400 of FIG. 4 may be performed in parallel or in any suitable order.

FIG. 5 is a flow diagram of a method of estimating a relayed wireless signal at a destination network node in a multihop wireless communications network, according to particular embodiments. In particular embodiments, one or more steps of method 500 may be performed by components of wireless network 100 described with reference to FIGS. 1-7. For example, the destination network node may comprise a destination network node 120 such as destination node 214.

The method begins at step 512 where the destination network node receives a wireless signal relayed from a plurality of network nodes, each of the network nodes corresponding to a relay stage and the received wireless signal comprising successive quantizations of a source wireless signal performed at each relay stage by one of the plurality of network nodes. For example, network node 120c may receive a wireless signal relayed from network nodes 120a and 120b. Network node 120a may quantize a wireless signal and transmit it to network node 120b. Network node 120b may quantize its received signal and transmit its quantized signal to network node 120c. The wireless signal received at network node 120c may be referred to as comprising successive quantizations of a source wireless signal. Particular embodiments may include any suitable number of quantizations.

At step 514, the destination network node receives a plurality of messages, each of the plurality of messages including quantization information associated with a quantization performed at a corresponding relay stage. For example, for each of the quantizations performed network nodes 120*a* and 120*b*, network node 120*c* may receive associated quantization information. As described above, the quantization information may include any suitable quantization parameter such as a quantization bit rate, a quantization level, a quantization codebook, etc.

In particular embodiments, the messages may also include a channel matrix. For example, the channel matrix may describe a pilot or reference signal associated with the original signal (y) received at network nodes 120*a* and 120*b*.

At step 516, the destination network node estimates a wireless signal received at a previous relay stage using a quantized MIMO channel model with the received wireless signal and a message of the plurality of messages corresponding to the quantization performed at the previous relay stage. For example, network node 120*c* may estimate the signal received at network node 120*b* based on the quantization information and the received quantization information. In particular embodiments, network node 120*c* may also use the channel matrix observed at network node 120*b* to estimate the signal received at network node 120*b*.

In particular embodiments, the estimation is performed using a quantized MIMO channel model. For example, destination node 120*c* may use a conventional MIMO receiver such as a sphere decoder, a zero-forcing receiver, a MMSE receiver, and an integer-forcing receiver. Because the embodiments described herein facilitate the use of a conventional MIMO receiver for decoding, particular embodiments may realize improvements over joint decoding and maintain low decoding complexity.

At step 518, the destination network node determines if the estimated signal from step 516 includes quantized signals from previous stages. If so, the destination network returns to step 516 to estimate the wireless signal received at the previous stage. The destination network node continues repeating this process until all the stages have been estimated and the destination network node has estimated the original wireless signal.

In particular embodiments, the destination node may repeat step 516 once for each message in a list of messages. In some embodiments the destination network node may analyze each estimated signal to determine whether the estimated signal includes an encoded message. If so, the destination node may repeat step 516 until the estimated signal does not include an encoded message, which means the estimated signal is the original signal.

At step 520, the destination node has successively estimated the signals received at each relay stage until it estimated the original signal.

Modifications, additions, or omissions may be made to method 500. Additionally, one or more steps in method 500 of FIG. 5 may be performed in parallel or in any suitable order.

FIG. 6A is a block diagram illustrating an example embodiment of a network node. The network node is an example of the network nodes 120 illustrated in FIG. 1. The network node may relay a wireless signal by receiving a wireless signal, quantizing the wireless signal to obtain a quantization index (or bin index), encoding the quantization index and sending it to another network node. The network node may decode a quantized signal by successively decoding quantized signals until the original wireless signal is estimated. The network node may use a MIMO channel model to decode the received wireless signal.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 610, at least one processor 620, at least one memory 630, and at least one network interface 640. Transceiver 610 facilitates transmitting wireless signals to and receiving wireless signals from a wireless device, such as wireless devices 110 (e.g., via an antenna); processor 620 executes instructions to provide some or all of the functionality described above as being provided by a network node 120; memory 630 stores the instructions executed by processor 620; and network interface 640 communicates signals to backend network components, such as a gateway, switch, router, Internet, Public Switched Telephone Network (PSTN), controller, and/or other network nodes 120. Processor 620 and memory 630 can be of the same types as described with respect to processor 720 and memory 730 of FIG. 7 below.

In some embodiments, network interface 640 is communicatively coupled to processor 620 and refers to any suitable device operable to receive input for network node 120, send output from network node 120, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network.

In particular embodiments, processor 620 in communication with transceiver 610 may relay wireless signals by quantizing a received wireless signal and transmitting the quantized wireless signal and a quantization index to a relay network node or a destination network node. Processor 620 in communication with transceiver 610 may estimate a wireless signal transmitted by a source node by successively decoding quantized signals until the source wireless signal is determined. The decoding may be performed using the received quantization index and a MIMO channel model.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 6B is a block diagram illustrating example components of a network node 120. The components may include receiving module 650, quantizing module 652, estimating module 654, message generating module 656, and transmitting module 658. Particular embodiments may comprise some or all of these modules. For example, a relaying network node may comprise receiving module 650, quantizing module 652, message generating module 656, and transmitting module 658. A destination network node may comprise receiving module 650 and estimating module 654. Some embodiments may perform both relaying and destination functionality and may comprise all the modules listed above.

Receiving module 650 may perform the receiving functions of network node 120. For example, receiving module 650 may receive original or relayed wireless signals. In certain embodiments, receiving module 650 may include or be included in processor 620. Receiving module 650 may include circuitry configured to receive radio signals. In particular embodiments, receiving module 650 may communicate with quantizing module 652 and estimating module 654.

Quantizing module 652 may perform the quantizing functions of network node 120. For example, quantizing module 652 may quantize (e.g., using a QMF transmission scheme) a received wireless signal. In certain embodiments, quantizing module 652 may include or be included in processor 620. In particular embodiments, quantizing module 652 may communicate with receiving module 650, message generating module 656, and transmitting module 658.

Estimating module 654 may perform the signal estimating functions of network node 120. For example, estimating module 654 may successively decode quantized wireless signals to estimate an original wireless signal. Estimating module 654 may decode quantized wireless signals using a MIMO channel model. In certain embodiments, estimating module 654 may include or be included in processor 620. Estimating module 870 may include MIMO receivers such as a sphere decoder, a zero-forcing receiver, a MMSE receiver, and an integer-forcing receiver. In particular embodiments, transmitting module 870 may communicate with mapping module 850 or scheduling module 860.

Message generating module 656 may perform the message generating functions of network node 120. For example, message generating module 656 generate a message including quantization information, such as a quantization index, a quantization level, a quantization rate, a quantization codebook, etc. In certain embodiments, message generating module 656 may include or be included in processor 620. In particular embodiments, message generating module 656 may communicate with quantizing module 652 and transmitting module 658.

Transmitting module 658 may perform the transmitting functions of network node 120. For example, transmitting module 658 may transmit messages and quantized wireless signals. In certain embodiments, transmitting module 658 may include or be included in processor 620. Transmitting module 658 may include circuitry configured to transmit radio signals. In particular embodiments, transmitting module 658 may communicate with quantizing module 652 and message generating module 656.

Figure 7:
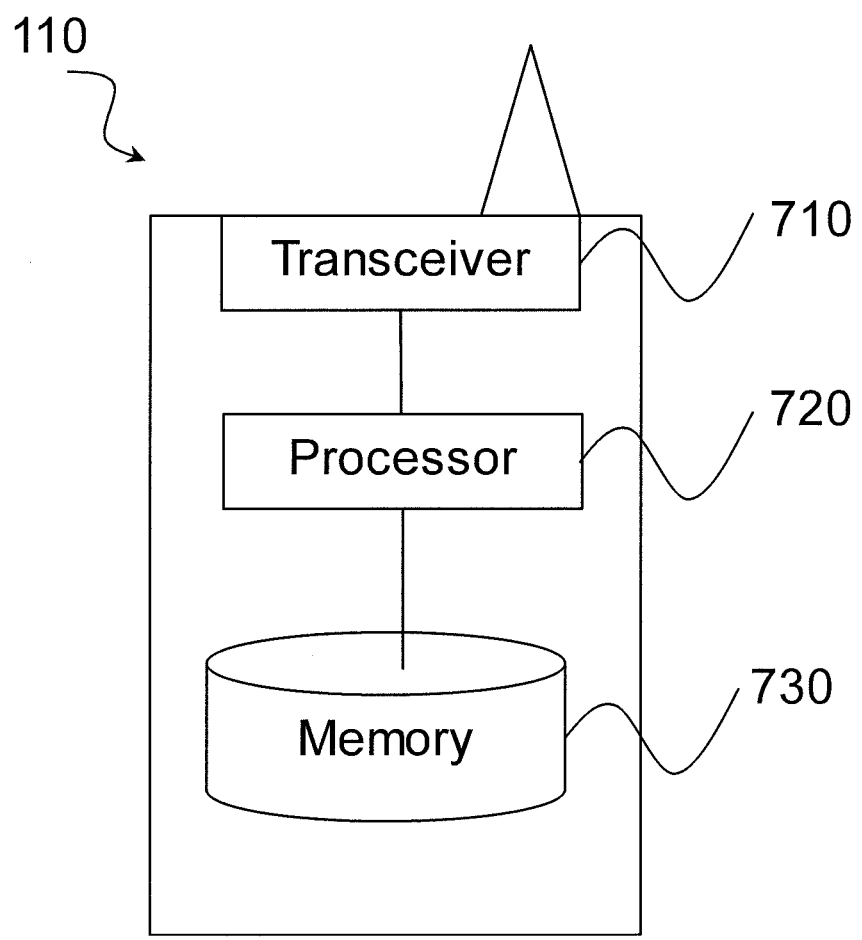
FIG. 7 is a block diagram illustrating an example embodiment of a wireless device.

FIG. 7 is a block diagram illustrating an example embodiment of a wireless device. The wireless device is an example of the wireless devices 110 illustrated in FIG. 1. The wireless device is operable to communicate with relay nodes in a multihop wireless network.

Particular examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 710, processor 720, and memory 730. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 720 in communication with transceiver 710 is operable to communicate with relay nodes in a multihop wireless network, such as network 100. Other embodiments of the wireless device may include additional components (beyond those shown in FIG. 7) responsible for providing certain aspects of the wireless device's functionality, including any of the functionality described above and/or any additional functionality (including any functionality necessary to support the solution described above). Some embodiments of the disclosure may provide one or more technical advantages.

As an example, some embodiments include a stage-by-stage successive MIMO decoding at a destination node that approaches the performance of the optimal joint decoding but with significantly lower complexity. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CF Compress and Forward
D2D Device to Device DF Decode and Forward
eNB eNodeB
LTE Long Term Evolution
M2M Machine to Machine
MIMO Multi-Input Multi-Output
MMSE Minimum Mean Square Error
NNC Noisy Network Coding
QMF Quantize Map and Forward
RAN Radio Access Network
RAT Radio Access Technology
RRH Remote Radio Head
RRU Remote Radio Unit
SNNC Short Message NNC
SF Store and Forward
UE User Equipment
WAN Wireless Access Network

The invention claimed is:

1. A method of relaying wireless signals from a first network node to a second network node in a multihop wireless communications network, the method comprising:
receiving, at the first network node, a wireless signal;
quantizing the wireless signal;
associating quantization information with the quantized wireless signal in a message, the quantization information comprising parameters characterizing operation of a quantizer used to quantize the wireless signal including at least one of a quantization level, a quantization rate, and a quantization codebook; and
transmitting the quantized wireless signal and the message to the second network node.

2. The method of claim 1, wherein the message further includes a channel matrix associated with the received wireless signal.

3. The method of claim 1, wherein transmitting the message to the second network node comprises encoding the message inband.

4. The method of claim 1, wherein transmitting the message to the second network node comprises out-of-band signaling.

5. A method of estimating a relayed wireless signal at a destination network node in a multihop wireless communications network, the method comprising:
receiving, at the destination network node, a wireless signal relayed from a plurality of network nodes, each of the network nodes corresponding to a relay stage, and wherein the received relayed wireless signal comprises successive quantizations of a source wireless signal performed at each relay stage by one of the plurality of network nodes;
receiving, at the destination network node, a plurality of messages, each message of the plurality of messages including quantization information associated with a quantization performed at a corresponding relay stage, the quantization information comprising parameters characterizing operation of a quantizer used at the corresponding relay stage including at least one of a quantization level, a quantization rate, and a quantization codebook;
estimating a wireless signal received at a previous relay stage using a quantized multiple-input multiple-output (MIMO) channel model with the received relayed wireless signal and a message of the plurality of messages corresponding to the quantization performed at the previous relay stage; and
estimating the source wireless signal using the estimated wireless signal received at the previous relay stage and the plurality of messages to estimate a wireless signal received at each of the previous relay stages.

6. The method of claim 5, wherein each message of the plurality of messages further includes a channel matrix associated with the received relayed wireless signal.

7. The method of claim 6, wherein estimating the wireless signal received at the previous relay stage further comprises using the channel matrix associated with the received relayed wireless signal.

8. The method of claim 5, wherein receiving the plurality of messages comprises receiving messages encoded inband.

9. The method of claim 5, wherein receiving the plurality of messages comprises receiving out-of-band signaling.

10. The method of claim 5, wherein estimating the wireless signal using the quantized MIMO channel model comprises using at least one of a sphere decoder, a zero-forcing receiver, a minimum-mean square error (MMSE) receiver, and an integer-forcing receiver.

11. A network node operable to relay wireless signals to a second network node in a multihop wireless communications network, the network node comprising a processor operable to:
receive a wireless signal;
quantize the wireless signal;
associate quantization information with the quantized wireless signal in a message, the quantization information comprising parameters characterizing operation of a quantizer used to quantize the wireless signal including at least one of a quantization level, a quantization rate, and a quantization codebook; and
transmit the quantized wireless signal and the message to the second network node.

12. The network node of claim 11, wherein the message further includes a channel matrix associated with the received wireless signal.

13. The network node of claim 11, wherein the processor is operable to transmit the message to the second network node by encoding the message inband.

14. The network node of claim 11, wherein the processor is operable to transmit the message to the second network node via out-of-band signaling.

15. A network node operable to estimate a relayed wireless signal in a multihop wireless communications network, the network node comprising a processor operable to:
receive a wireless signal relayed from a plurality of relay network nodes, each of the relay network nodes corresponding to a relay stage, and wherein the received relayed wireless signal comprises successive quantizations of a source wireless signal performed at each relay stage by one of the plurality of relay network nodes;
receive a plurality of messages, each message of the plurality of messages including quantization information associated with a quantization performed at a corresponding relay stage, the quantization information comprising parameters characterizing operation of a quantizer used at the corresponding relay stage including at least one of a quantization level, a quantization rate, and a quantization codebook;
estimate a wireless signal received at a previous relay stage using a quantized multiple-input multiple-output (MIMO) channel model with the received relayed wireless signal and a message of the plurality of messages corresponding to the quantization performed at the previous relay stage; and
estimate the source wireless signal using the estimated wireless signal received at the previous relay stage and the plurality of messages to estimate a wireless signal received at each of the previous relay stages.

16. The network node of claim 15, wherein each message of the plurality of messages further includes a channel matrix associated with the received relayed wireless signal.

17. The network node of claim 16, wherein the processor is further operable to estimate the wireless signal received at the previous relay stage using the channel matrix associated with the received relayed wireless signal.

18. The network node of claim 15, wherein the processor is operable to receive the plurality of messages encoded inband.

19. The network node of claim 15, wherein the processor is operable to receive the plurality of messages via out-of-band signaling.

20. The network node of claim 15, wherein the processor is operable to estimate the wireless signal using the quantized MIMO channel model using at least one of a sphere decoder, a zero-forcing receiver, a minimum-mean square error (MMSE) receiver, and an integer-forcing receiver.

* * * * *